United States Patent
Isnardi

(10) Patent No.: US 8,077,707 B2
(45) Date of Patent: Dec. 13, 2011

(54) SYSTEMS AND METHODS FOR DIGITAL STREAM DENTING

(75) Inventor: Michael Anthony Isnardi, Plainsboro, NJ (US)

(73) Assignee: SRI International, Menlo Park, CA (US)

( * ) Notice: Subject to any disclaimer, the term of this patent is extended or adjusted under 35 U.S.C. 154(b) by 435 days.

(21) Appl. No.: 11/561,887

(22) Filed: Nov. 20, 2006

(65) Prior Publication Data

US 2007/0115969 A1    May 24, 2007

Related U.S. Application Data

(60) Provisional application No. 60/738,255, filed on Nov. 18, 2005.

(51) Int. Cl.
*H04L 12/28* (2006.01)
(52) U.S. Cl. .................................. 370/389; 725/136
(58) Field of Classification Search .................. 370/389, 370/402, 254, 392; 340/825; 725/136
See application file for complete search history.

(56) References Cited

U.S. PATENT DOCUMENTS

| | | | |
|---|---|---|---|
| 5,708,659 A * | 1/1998 | Rostoker et al. | 370/392 |
| 2003/0159139 A1 * | 8/2003 | Candelore et al. | 725/25 |
| 2005/0074021 A1 * | 4/2005 | Bossemeyer et al. | 370/420 |
| 2005/0157660 A1 * | 7/2005 | Mandato et al. | 370/254 |
| 2007/0074267 A1 * | 3/2007 | Clerget et al. | 725/136 |

* cited by examiner

*Primary Examiner* — Dang Ton
*Assistant Examiner* — Wei Zhao
(74) *Attorney, Agent, or Firm* — Moser Taboada

(57) ABSTRACT

A method of forming a digital packet stream, the stream including transport packets. The method can include receiving a packet ID in a transport stream, determining if the packet ID includes a video ID, determining if a coded video frame starts a transport packet, and if a coded video frame starts a transport packet, inserting an Internet protocol/user datagram protocol (IP/UDP) header ahead of a transport packet header. The received transport stream can be an MPEG-2 transport stream. A method of forming a digital packet stream can include receiving a packet ID, determining if the packet ID includes a video ID, determining if a coded video frame starts a transport packet; determining a priority of the video frame, and inserting an IP/UDP header ahead of a transport packet header.

8 Claims, 10 Drawing Sheets

SYSTEMS AND METHODS FOR DIGITAL STREAM DENTING

CROSS-REFERENCE TO RELATED APPLICATION

This application claims the benefit of U.S. Provisional Patent Application No. 60/738,255, filed Nov. 18, 2005, the contents of which are hereby incorporated by reference herein.

FIELD OF THE INVENTION

Embodiments of the invention relate generally to digital streams, and, more particularly, to systems and methods for digital stream denting.

BACKGROUND OF THE INVENTION

Internet Protocol TV (IPTV) is an emerging technology that allows telecommunications service providers to deliver digital TV (DTV) and other services over the phone lines to subscribers' homes. There are many existing or proposed standards for broadcasting a DTV program to the home. In particular, there are numerous transport-layer encapsulation protocols either defined by existing standards, or being proposed for future standards.

As shown in FIG. 1, in system 100, video and audio are encoded (compressed), either in real-time or non real-time. The video encoders 102 and audio encoders 104 are generally synchronized to the same System Time Clock (STC) 106 (e.g., 27 MHz for MPEG-2 Systems). Samples of the STC are sent either in selected MPEG-2 Transport packets, where they are called Program Clock References (PCRs), or as a timestamp in a Network Time Protocol (NTP) IP packet. Time stamps (TS) locked to the STC are produced, but are generally sent with a coarser time resolution. For example, MPEG-2 Systems typically use a 90 kHz clock for time stamps, which is 300 times slower than the system clock. Time stamps are generally associated with one or more access units (coded video or audio frames).

The outputs of the encoders are referred to as elementary streams. For IPTV, a number of different encapsulation protocols exist:

One common encapsulation method is to multiplex the video and audio elementary streams (VES and AES) into an MPEG-2 transport stream (TS) using an MPEG-2 Transport Encoder. (MPEG-2 TE). PCRs and time stamps provide timing and synchronization information. An integral number of consecutive MPEG-2 TS packets (each 188 bytes long) are encapsulated into a real-time transport protocol (RTP) packet. Each RTP packet is encapsulated into a user datagram protocol (UDP) packet. Each UDP packet is in turn encapsulated into an IP packet.

Another encapsulation method is to bypass the RTP layer and encapsulate the MPEG-2 TS packets directly into UDP/IP.

Yet another encapsulation method is to bypass the MPEG-2 TS layer and encapsulate the audio/video elementary stream packets directly into RTP/UDP/IP. The NTP clock samples and RTP time stamps contain timing and synchronization information.

Whatever the encapsulation method, the IP packet stream then passes through the telecommunication company's digital subscriber line (DSL) access multiplexer (DSLAM) 110 where it may be mixed with other IP streams. The aggregated IP stream is sent over unshielded twisted pair to a subscriber's home using some version of xDSL (e.g., ADSL, VDSL2, etc.). The DSL signal is demodulated by a subscriber's DSL modem 112. The DSL modem may be integrated into an IPTV set-top box (STB) 114 or may be a separate unit. Inside the IPTV STB, the transport layers are de-encapsulated, and the VES/AES data and timing/synchronization information, via a timing recovery module 116, is sent to the video decoders 118 and audio decoders 120. The output of the video and audio decoders are attached to monitor(s) and speakers, respectively.

In unmanaged IP networks, IP packets can be lost, received out of order, delayed or received with jitter. Various technologies can be applied to combat these unwanted effects. For example, packets can be duplicated or made more robust with FEC to guard against lost packets. Sequence numbers in RTP headers can be used to re-order out-of-order or delayed packets into their correct order. Larger decoder buffers can be used to de-jitter packets. If precautions are not applied, lost IP packets can produce poor Quality of Service by inducing glitches into the decoded video, audio or both.

Another source of IP packet loss is at the DSLAM. If congestion occurs at the DSLAM, it will need to drop IP packets. Naïve packet dropping will produce the poor quality of service discussed above. If the video packets are prioritized, and if the DSLAM is responsive to this prioritization, it would be possible to improve the quality of service.

Denting, or packet dropping, is the action of dropping IP packets at the DSLAM. A DSLAM that incorporates "smart denting" looks at priority signals either in the packet headers or in the video payload and attempts to drop only low-priority video packets. Examples of low-priority video frames are MPEG-2 "B" pictures or H.264 "disposable B" pictures, as are known to those of skill in the art. If the video bitstream contains low-priority pictures, the DSLAM can preferentially drop these pictures so that error propagation at the decoder is eliminated or greatly reduced. This will increase the video quality of service.

As described herein, it is assumed that the DSLAM can only respond to congestion by dropping units of IP packets. If the IP packets do not contain an MPEG-2 Transport layer, and if one or more video frames (in coding order) are encapsulated in RTP/UDP/IP or UDP/IP packets, then it can be relatively straightforward for the DSLAM to drop low-priority video frames, since there is a direct mapping of video frames to IP packets. However, if an MPEG-2 Transport layer is present, there is currently no simple or natural mapping of video frames to IP packets.

Thus, there is a need for an improved systems and methods for digital stream denting to provide for a simple mapping of video frames to IP packets.

SUMMARY OF THE INVENTION

Embodiments of the invention can include a method of forming a digital packet stream, the stream including transport packets. The method can include receiving a packet ID in a transport stream, determining if the packet ID includes a video ID, determining if a coded video frame starts a transport packet, and if a coded video frame starts a transport packet, inserting an Internet protocol/user datagram protocol (IP/UDP) header ahead of a transport packet header. The received transport stream can be an MPEG-2 transport stream.

Embodiments of the invention can include a method of forming a digital packet stream can include receiving a packet ID, determining if the packet ID includes a video ID, determining if a coded video frame starts a transport packet; determining a priority of the video frame, and inserting an IP/UDP header ahead of a transport packet header. A method of forming a digital packet stream can include receiving a packet ID, determining if the packet ID includes a video ID, determining if a coded video frame starts a transport packet, determining a priority of the video frame, identifying an audio packet, and determining if the audio packet lies within a boundary of a video frame. If the audio packet lies within a boundary of a video frame, sending the audio packet can be delayed until the current video frame has been sent, and inserting an IP/UDP header ahead of a transport packet header can be included.

Embodiments of the invention can include a method of forming a digital packet stream can include receiving a packet ID, determining if the packet ID includes a video ID, determining if a coded video frame starts a transport packet, determining a priority of the video frame and identifying an audio packet. The method can include determining if the audio packet lies within a boundary of a video frame, and, if the audio packet lies within a boundary of a video frame, delaying sending the audio packet until the current video frame has been sent; clustering a plurality of audio packets at the boundary of a video frame; and inserting an IP/UDP header ahead of a transport packet header.

Thus, by way of embodiments of the invention, improved systems and methods for digital stream denting are provided to establish a simple mapping of video frames to IP packets.

BRIEF DESCRIPTION OF THE DRAWINGS

The present invention will be more readily understood from the detailed description of exemplary embodiments presented below considered in conjunction with the attached drawings, of which.

It is to be understood that the attached drawings are for purposes of illustrating the concepts of the invention.

DETAILED DESCRIPTION OF THE INVENTION

Embodiments of the invention can be used to establish a simple mapping of video frames to IP packets, so that improved packet denting, and consequently, improved audio and video performance can be achieved.

Most real-time DTV encoders encapsulate the VES/AES in an MPEG-2 transport stream along with required MPEG and optional application-specific system information tables. Transport Streams that contain multiple programs must be encoded with Constant Bit Rate (CBR); however, transport streams (TS) that contain a single program may be encoded CBR or Variable Bit Rate (VBR). Throughout this disclosure, we will assume a single program transport stream and will consider the general case of VBR.

Figure 1:
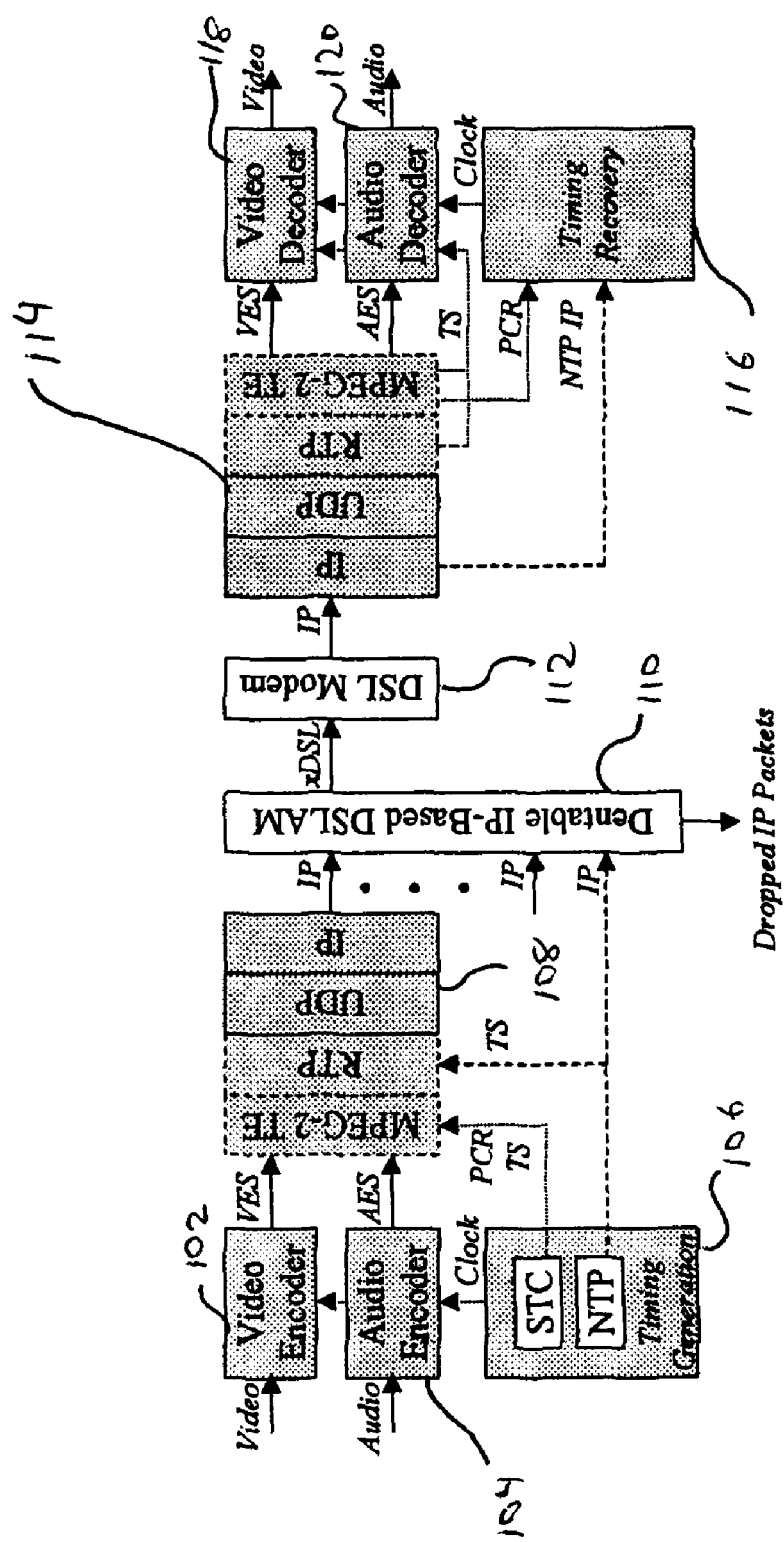
FIG. 1 is a schematic diagram of a system for encoding and decoding digital signals.
Figure 2:
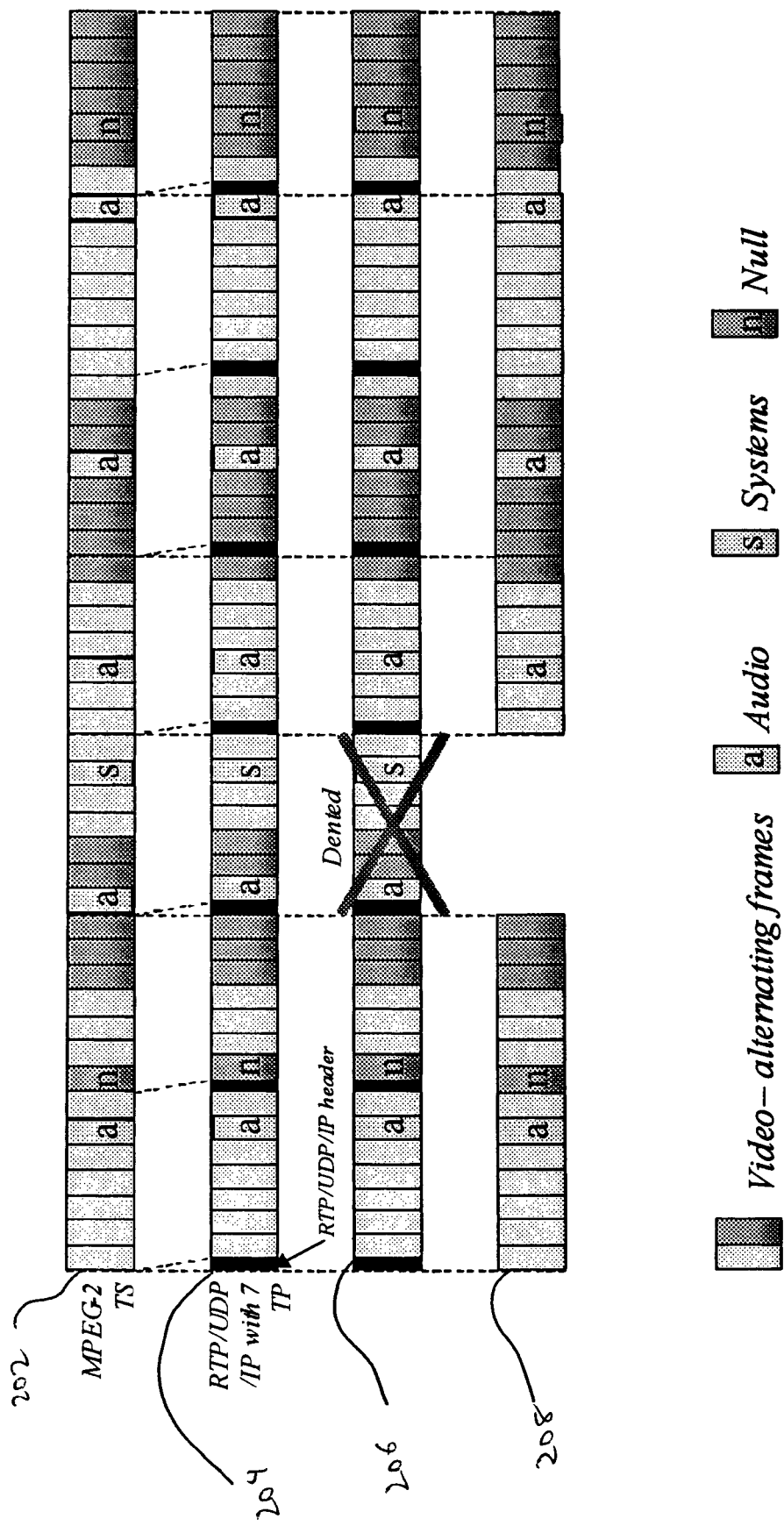
FIG. 2 is a schematic diagram illustrating denting of digital packet streams.

Presently available MPEG-2 TS encoders are unaware of any subsequent multi-protocol encapsulation and denting, so they simply produce a packet stream that is compliant with MPEG-2 System's "Transport System Target Decoder (T-STD)" model. What this means is that Video, Audio, System and Null transport packets are intermingled in the stream, and one cannot guarantee that dropping an IP packet will drop only a low-priority video packet. The problem is illustrated in FIG. 2, in which RTP/UDP/IP packets containing a fixed payload of seven MPEG-2 transport packets is assumed. As shown in schematic 200, the MPEG-2 transport stream 202 is encapsulated such that each group of seven transport packets is combined with a RTP/UDP/IP header into a resultant stream 204 of IP packets. When an IP packet is dropped or dented from the stream 206, the resultant stream multiple video packets and/or high priority video packets, as well as audio packets and system packets, can be dropped from the stream 208.

Embodiments of the invention described below improve the mapping of MPEG-2 transport packets to IP packets. Unless otherwise specified, the RTP layer is optional.

Align IP Headers to Video Frame Boundaries.

Figure 4:
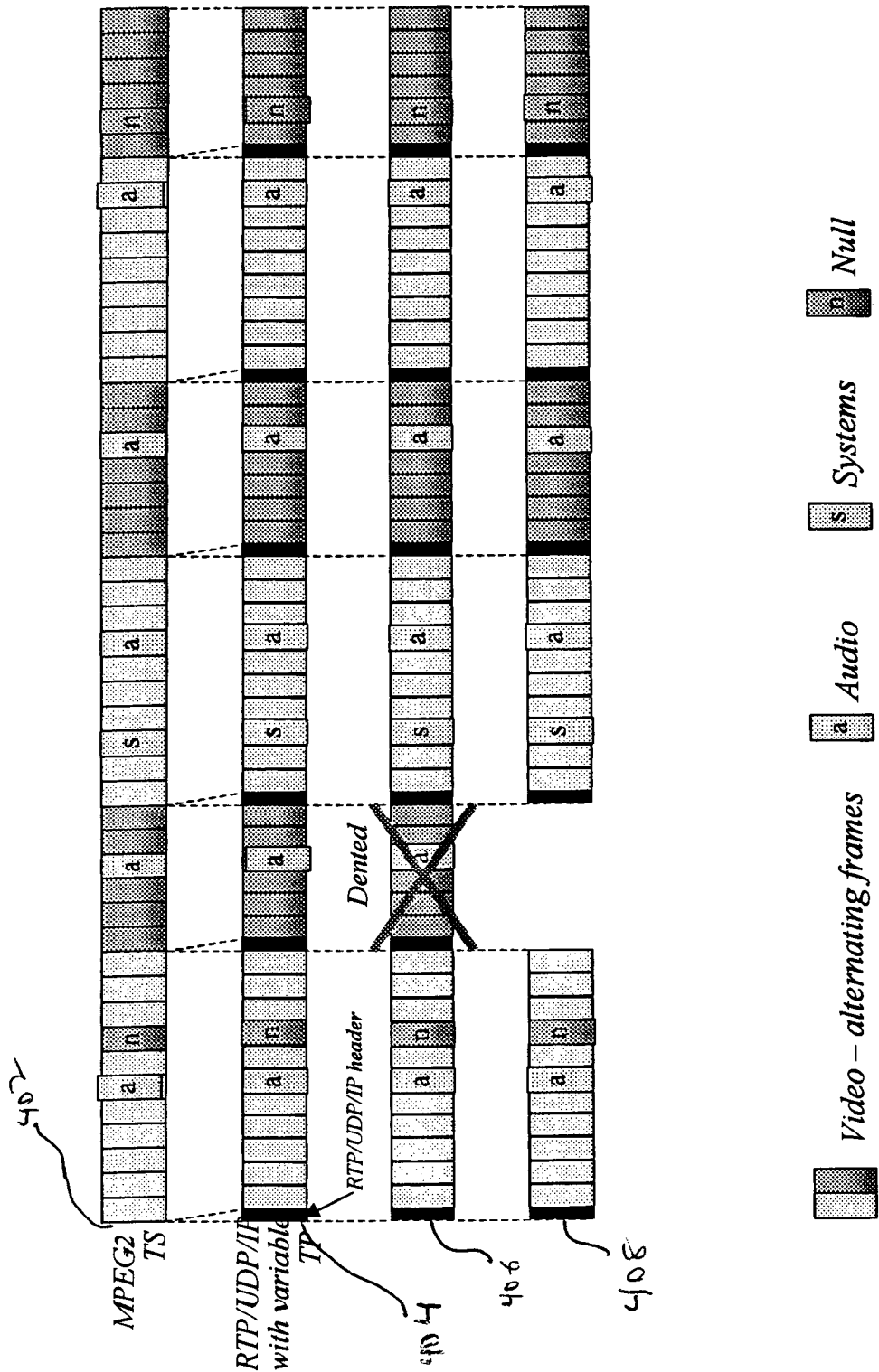
FIG. 4 is a schematic diagram illustrating digital packet streams, formed in accordance with embodiments of the invention.

In this embodiment, the MPEG-2 TS is unmodified. However, instead of encapsulating a fixed number of MPEG-2 TP in an IP packet, a variable number is used. Furthermore, a new IP packet is formed whenever the start of a video frame of a given priority is found in the TS. This is shown in FIG. 4, where it is assumed that all video frames (independent of priority) are aligned to IP packet boundaries. In FIG. 4, the MPEG-2 transport stream 402 is encapsulated with variable encapsulation packets such that each group of transport packets that is combined with a RTP/UDP/IP header into a resultant stream 404 of IP packets begins at a new video frame boundary. When an IP packet is dropped or dented from the stream 406, the resultant stream will only lose a single video frame from the stream 408.

Figure 3A:
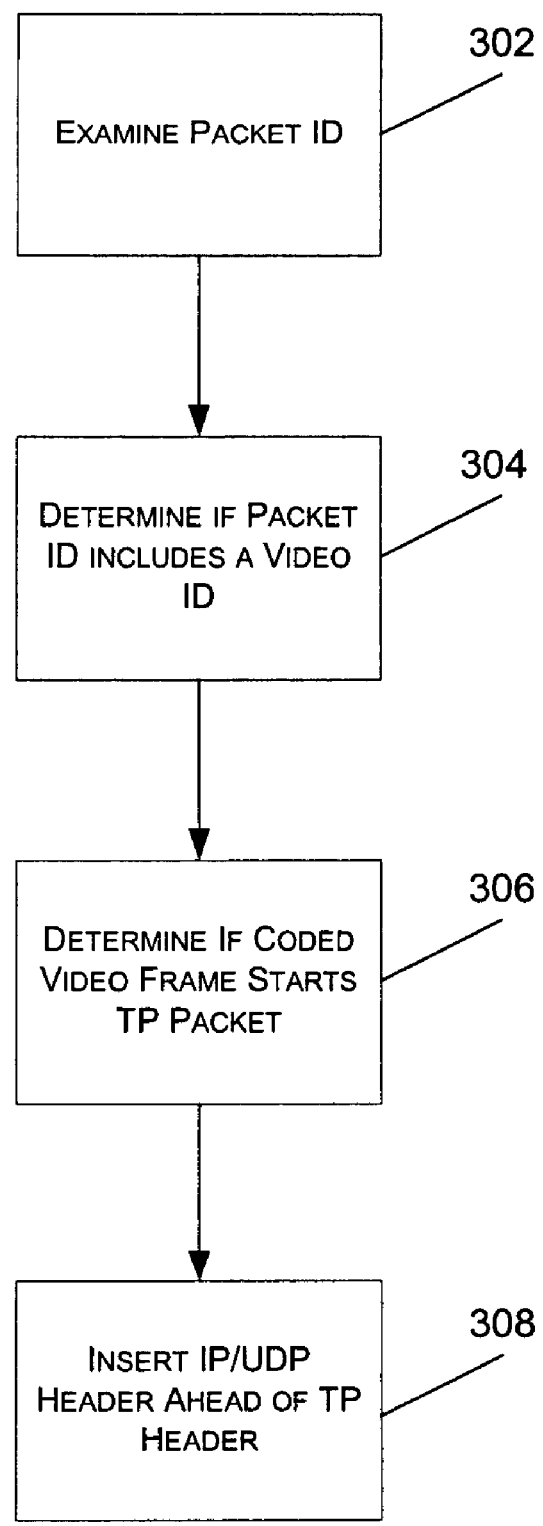
FIGS. 3a and 3b are flow diagrams illustrating methods of forming digital packet streams, in accordance with embodiments of the invention.
Figure 3B:
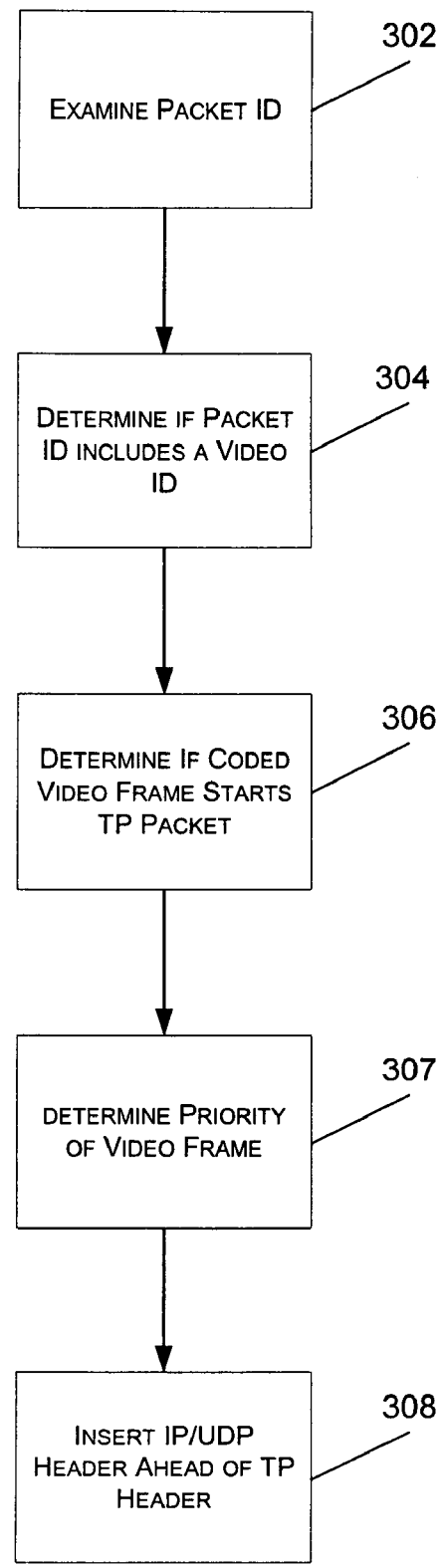

As shown in FIG. 3a, embodiments of the method 300 can include examining a packet ID 302, determining if the packet ID includes a video ID 304, determining if a coded video frame starts a TP packet 306, and, if a coded video frame starts a TP packet, inserting an IP/UDP header ahead of the TP header 308. With reference to FIG. 3b, optionally, the priority of the video frame can be determined 307.

A transport packet containing the start of a coded video frame can be detected and IP-packetized as follows:

1. Examine the 13-bit Packet ID (PID) in the TP header. If this is a video PID (deduced by parsing the MPEG-2 Program Association Table (PAT) and Program Map Table (PMT) present in previous Systems packets), then proceed to Step 2.

2. Examine the 1-bit payload_unit_start_indicator in the TP header. If this is set to '1', then a video Packetized Elementary Stream (PES) packet header will be the first bytes in the TP payload. In all current DTV systems, each coded video frame is mapped to a single PES packet, and coded video frames are aligned to PES packet boundaries. Therefore, if the payload_unit_start_indicator is set to '1', then a coded video frame starts in this TP packet.

3. Optionally, examine the priority of this video frame. There are several different ways to signal priority level. One or more of these methods must be agreed upon by the video/transport encoders and IP encapsulators. Any of the following methods may be used to signal video frame priority:

a. For any video compression standard, the transport_priority bit in the TP header can be used. For instance, TPs containing low-priority, non-referenced B-frame payload data can set this bit to '0'; in all other TPs, it can be set to '1'.

b. For MPEG-2 video, the 2-bit picture_coding_type field in the picture_header( ) structure can be used. If set to '11', then this is non-reference B frame. This method requires deeper payload parsing than method (a).

c. For H.264 video, the 2-bit nal_ref_idc field can be used. If set to '00', then this is a non-referenced picture. This method requires deeper payload parsing than method (a).

4. When the start of a video frame is found (Step 2) and, optionally, the priority is within a target range (Step 3), the IP encapsulator inserts an IP/UDP header and optional RTP header just prior to this MPEG-2 TP. Performing such video-aligned IP packetization is shown at the top of FIG. 4.

Some benefits of this embodiment can be that when an IP packet is dented (dropped), only the TPs associated with a single video frame are lost. If a non-referenced, low-priority frame is dropped, error propagation is minimized at the decoder. This improves the video quality of service. Also, in the absence of any IP packet loss, the MPEG-2 TS is left unmodified, so if it was compliant at the output of the TS encoder, it will be compliant at the input to the TS decoder. Thus, buffer violations will not be an issue.

Under certain circumstances, some drawbacks of this embodiment can be that the dented IP packet may also contain intermingled null, systems and/or audio packets. These packets will also be lost. However, lost null packets are of no consequence, as they contain no useful data—they simply pad the bitstream to maintain or increase the MPEG-2 TS bit rate. Similarly, lost systems data is of no consequence since the systems data (PAT, PMT and possible application-specific System Information tables) is repeated on a regular basis; the decoder can simply use the most recent copy it has saved in memory. However, lost audio packets will cause the audio decoding subsystem to perform some error concealment (e.g., muting). Unless other means are incorporated to protect the audio stream, the audio quality of service can potentially suffer with this method.

Align IP Headers to Video Frame Boundaries and Move any Audio Packets Outside.

Figure 5:
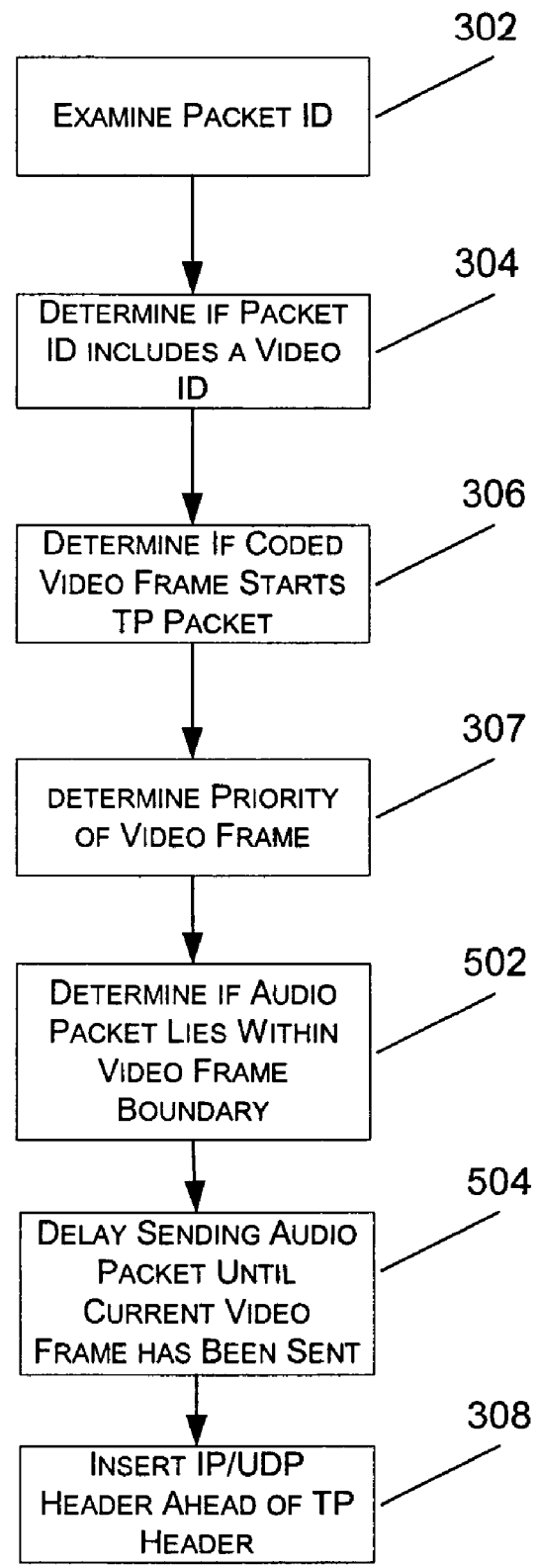
FIG. 5 is a flow diagram illustrating a method of forming digital packet stream, in accordance with embodiments of the invention.

As shown in FIG. 5, in addition to steps described above with respect to FIGS. 3*a* and 3*b*, it can be determined if an audio packet lies within a video frame boundary 502, and the sending of the audio frame can be delayed until the current video frame has been sent 504.

In this embodiment, the MPEG-2 TS is slightly modified by ensuring that audio packets lie between video frame boundaries, or at least do not lie within low-priority video frame boundaries. In some circumstances, this constraint would be added to a real-time MPEG-2 Transport Encoder so that the T-STD model is automatically satisfied. However, if this is not possible, then a post-processor could perform a functionally equivalent operation.

The constraint imposed on the packet scheduler of a real-time MPEG-2 Transport Encoder would be of the form "do not send the next audio packet until all video packets of the current video frame have been sent". This constraint could be imposed on all video frames, or could be imposed only on video frames of the lowest priority (e.g., non-reference frames). The consequence of slightly delaying an occasional audio packet is an occasional audio buffer underflow; this can be compensated, in large degree, by maintaining a slightly higher audio buffer fullness. There is generally enough headroom at the high end of the buffer to allow this. Even if there is a momentary audio buffer violation, this will generally not cause any noticeable glitch in real decoders because their buffers are generally over-designed compared to the idealized T-STD model.

If the TS modification is performed as a post-processor to a real-time MPEG-2 Transport Encoder, an additional check must be performed. If the audio packet is delayed to a position after one or more packets containing a PCR value, then either the bit rate must be momentarily modulated, or PCR values must be restamped. One of these two techniques must be done in order to avoid introduction of PCR jitter. The two techniques are described in more detail below in the section titled "Handling PCR packet displacement: Bit rate modulation vs. PCR restamping".

Once the above modifications are made to the MPEG-2 TS, the variable-length IP packetization described in the first embodiment described above is performed. This is demonstrated in FIG. 6., the MPEG-2 transport stream 602 is encapsulated with variable encapsulation packets such that each group of transport packets that is combined with a RTP/UDP/IP header into a resultant stream 604 of IP packets begins at a new video frame boundary, and audio packets are moved outside the packets of a single video frame. When an IP packet is dropped or dented from the stream 606, the resultant stream will only lose a single video frame from the stream 608, and it will likely not contain an audio frame.

Figure 6:
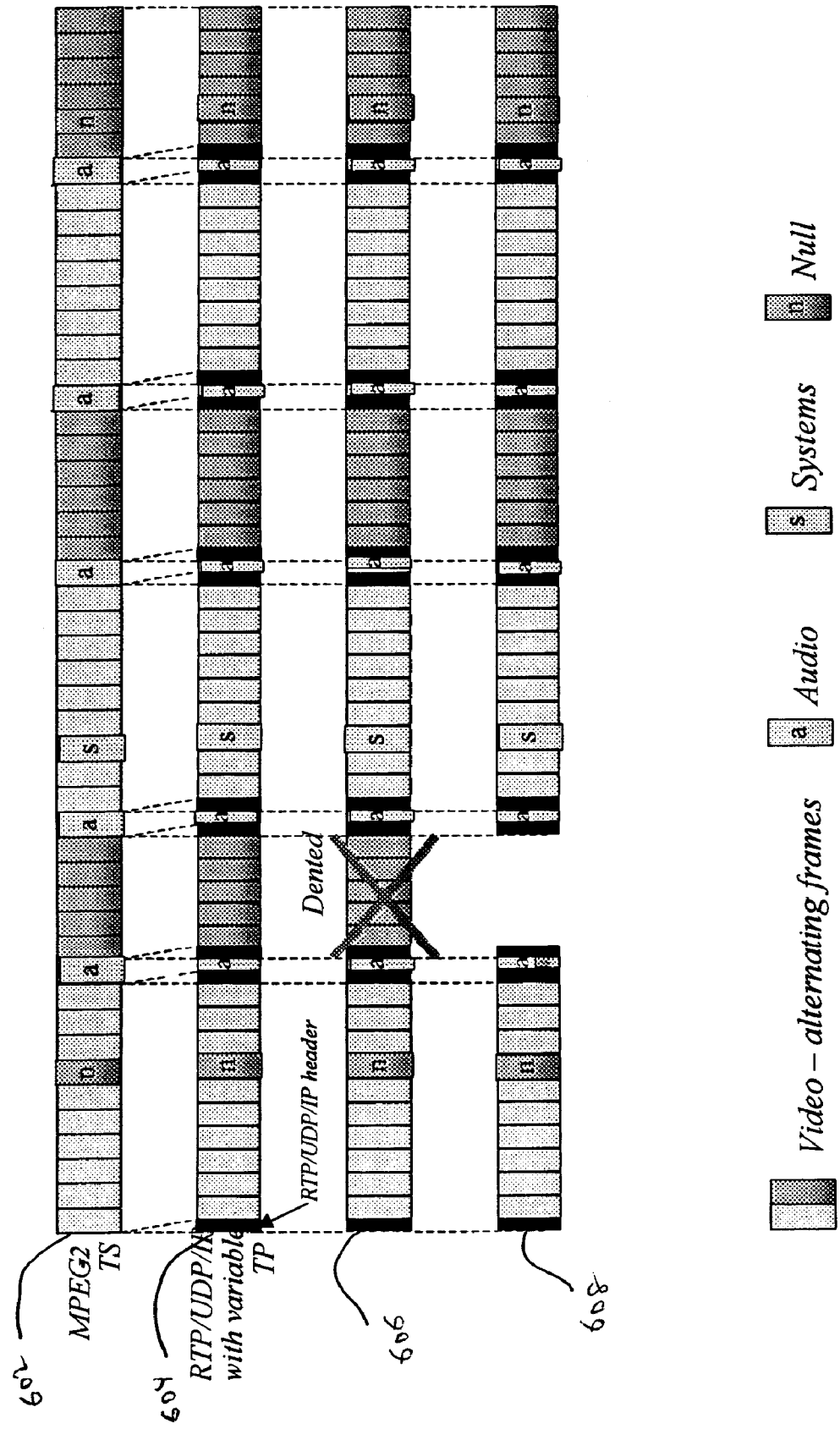
FIGS. 6-9 are schematic diagrams illustrating digital packet streams, formed in accordance with embodiments of the invention.

In FIG. 6, it is shown how alignment of IP packets to video frames, and moving audio packets outside video frame boundaries improves both video and audio quality of service.

Any non-video transport packets that reside between video frames can be IP packetized separately, as shown in FIG. 6. However, this would be inefficient for single transport packets. To increase efficiency, the IP encapsulator can include audio transport packets in IP packets that contain high-priority video frames.

Align IP Headers to Video Frame Boundaries and Clustered Audio Boundaries.

This embodiment is a variant of the previously discussed embodiment, in which audio transport packets are intentionally grouped to lie between video frame boundaries, or at least do not lie within low-priority video frame boundaries. This embodiment is more applicable to situations where the ratio of video to audio bit rates is small, for example 5:1. This is demonstrated in FIG. 7. In this example, there a in the above-described embodiment, the audio transport packets can be clustered or intermingled with high-priority video packets to get even higher packetization efficiency. As shown in the schematic 700, transport stream 702 is encapsulated with variable encapsulation packets such that each group of transport packets that is combined with a RTP/UDP/IP header into a resultant stream 704 of IP packets begins at a new video frame boundary, and audio packets are moved outside the packets of a single video frame. In addition, multiple audio packets can be clustered. When an IP packet is dropped or dented from the stream 706, the resultant stream will only lose a single video frame from the stream 708, and it will likely not contain an audio frame.

Figure 7:
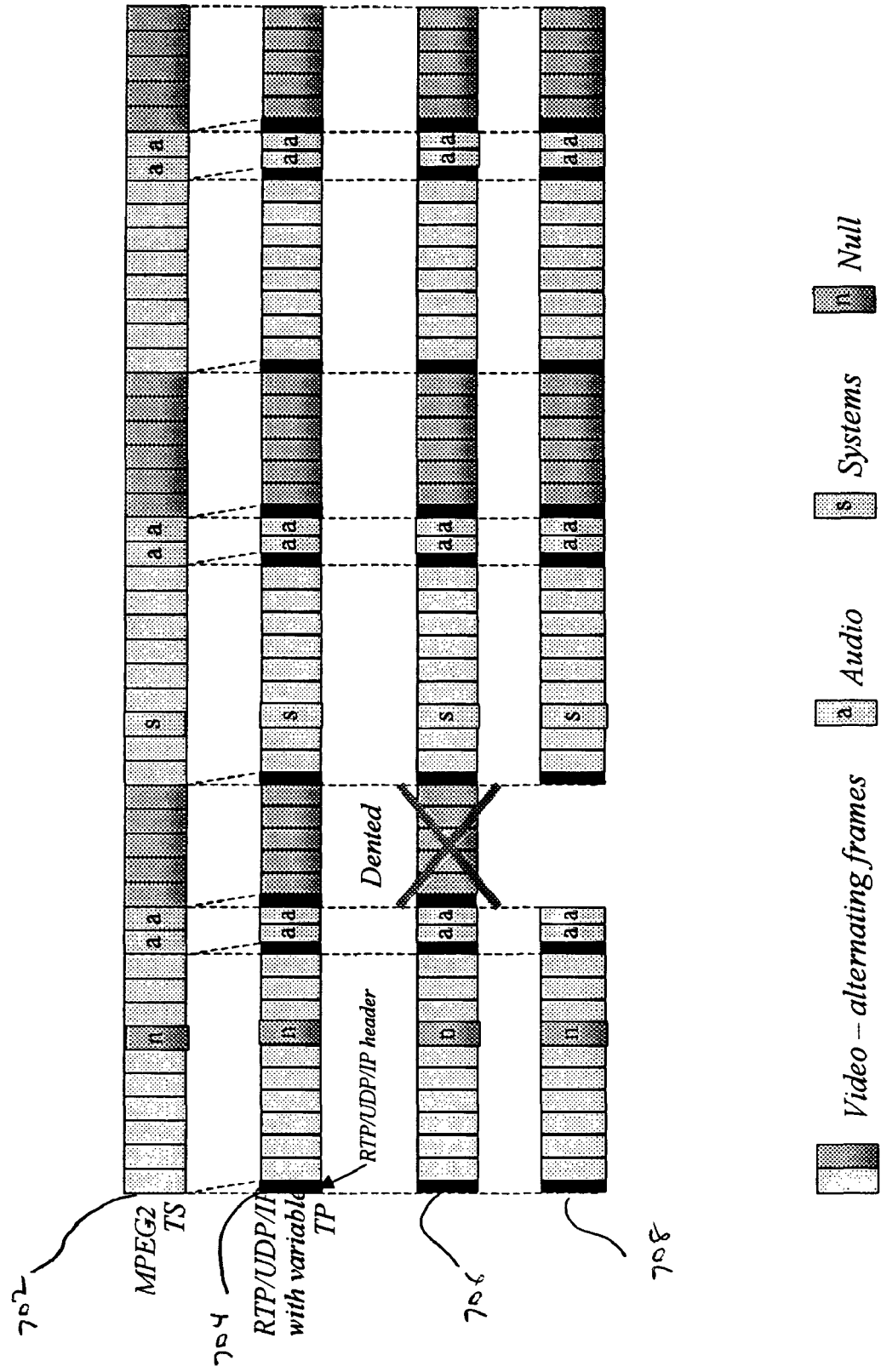

FIG. 7. shows clustering of video and audio packets, with alignment of IP packets to video frame boundaries and audio cluster boundaries. This improves both video and audio quality of service.

Since this example involves packet sequence modification, all of the statements discussed in the second embodiment discussed above, concerning buffer modeling and PCR restamping apply.

Insert Duplicate Packets for Audio and Place Outside Low-Priority Video Frame Boundaries.

This embodiment is a variant of the first embodiment discussed above, in which the original sequence of transport packets is left intact, with the exception that a duplicate audio transport packet is inserted in the transport stream for any audio transport packet that lies within the boundary of a low-priority video frame. This is meant to increase the audio quality of service in the event an IP packet containing a low-priority video frame with intermingled audio packet is dropped.

A duplicate audio transport packet contains the same payload as the original audio packet. The 4-bit continuity_counter must be the same as the original, and no other audio transport packets of the same PID can occur between the original and the duplicate. If a PCR exists in the original audio transport packet (which is allowed but unlikely), the duplicate packet must have a correct value, which means the PCR in the duplicate packet must be restamped relative to the original.

Figure 8:
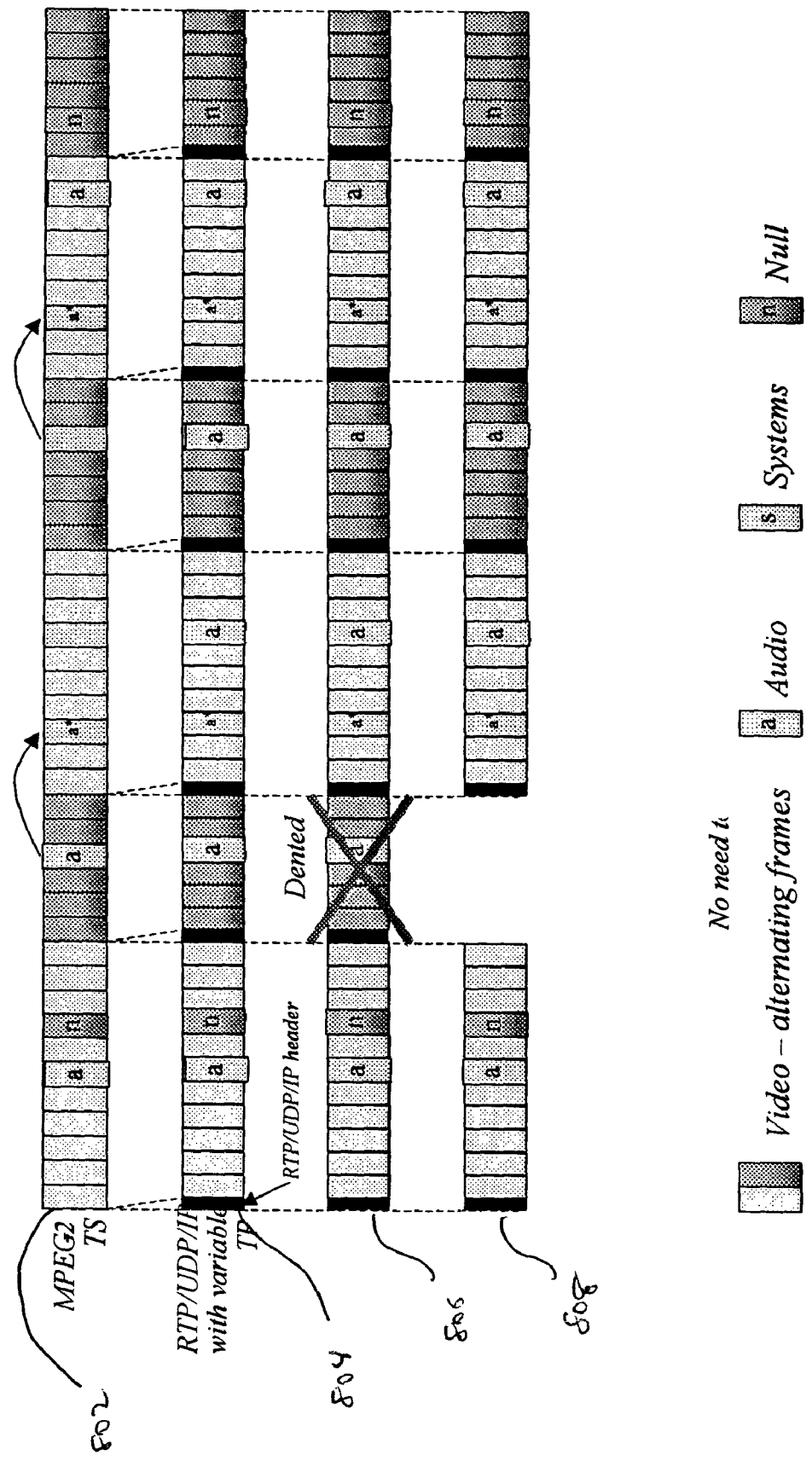

FIG. 8. shows duplicate audio packets (marked as *) being inserted after low-priority video frame boundaries. This improves the audio quality of service relative to the first embodiment described above.

For increased efficiency, the duplicate audio packet should replace any "sufficiently close" null packet that exists as long as the T-STD buffer model can still be respected.

If no null packet is sufficiently close to replace, the duplicate audio packet must be inserted into the stream as soon as possible after the end of the low-priority video frame boundary. Examination of the T-STD model will determine what is meant by "as soon as possible". Inserting packets into an MPEG-2 TS will momentarily increase the transport stream bit rate, and the transport stream encoder, or postprocessor, should calculate a new, slightly higher RT to account for this, and should send the transport packets between successive PCR values out at this slightly higher rate. If this is done correctly, PCR values do not need to be restamped, since a VBR MPEG-2 Transport Stream is by definition piecewise CBR, where instantaneous changes in bit rate happen at PCR instants.

Handling PCR Packet Displacement: Bit Rate Modulation vs. PCR Restamping.

When MPEG-2 Transport Packets containing PCRs (hereinafter called "PCR packets") are displaced, special care must be taken to keep prevent PCR jitter. If PCR jitter occurs, the recovered system clock at the decoder may fluctuate rapidly in frequency, causing undesirable effects such as picture freeze, color shifts or audio "wow and flutter". The issue is illustrated in FIG. 9.

Figure 9:
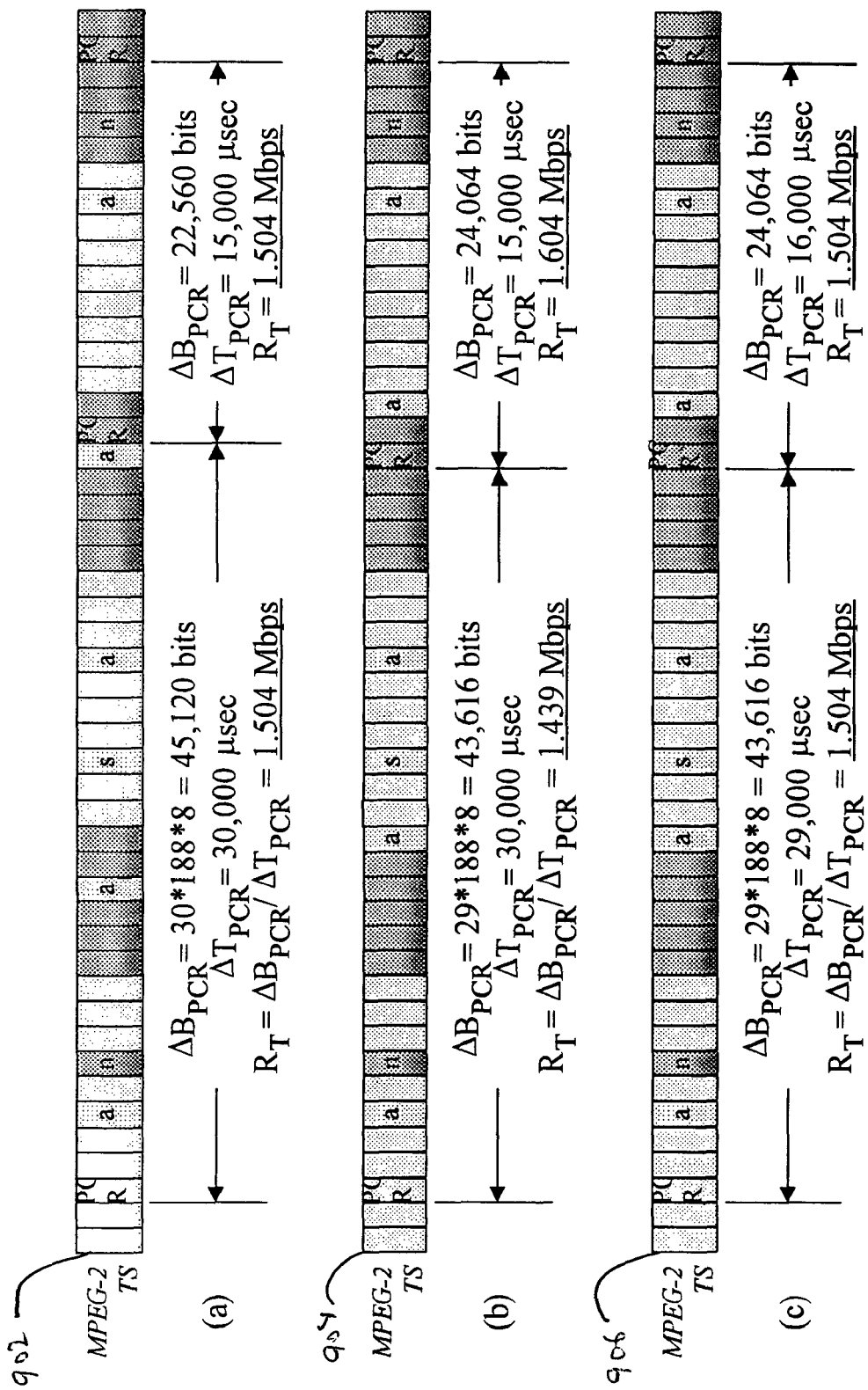

With reference to FIG. 9, two different methods for handling displacement of PCR packets. (a)(902) original MPEG-2 Transport Stream; (b)(904) MPEG-2 TS after PCR packet displacement, but without PCR restamping; (c)(906) MPEG-2 TS after PCR packet displacement, and with PCR restamping FIG. 9(a)(902) shows an original MPEG-2 TS before PCR packet displacement. Three PCR packets are shown. These packets contain PCRs, which are samples of a 27-MHz system clock. In an MPEG-2 TS, the instantaneous transport bit rate, RT, is piecewise constant between PCR samples. RT is calculated by dividing the number of bits between PCR values (DBPCR) by the difference between the encoded PCR values (DTPCR). Two such calculations are shown in FIG. 9(a)(902), and in this case, the transport bit rate is constant (1.504 Mbps). If RT is constant for all such intervals, the transport stream is called CBR, otherwise it is called VBR.

FIG. 9(a)(902) also shows two audio packets that are about to be displaced into the positions shown by the arrows. The first audio packet, after displacement, does not cross a PCR boundary and therefore does not affect PCR timing. However, the second audio packet, after displacement, does cross a PCR packet boundary, and will affect PCR timing. In essence, the middle PCR packet has been displaced, and timing must be adjusted to account for this.

Timing adjustment can be handled in two ways. FIG. 9(b) (004) shows how to handle the timing adjustment using bit rate modulation. This example can only be applied in situations where VBR is allowed in the output MPEG-2 TS. It cannot be used for CBR input streams that must remain CBR. Assuming VBR is allowed, the displaced PCR packet will cause RT to change in the two intervals. As shown in the calculations, RT becomes slightly smaller in the first interval (1.439 Mbps) and becomes slightly larger in the second interval (1.604 Mbps). In order for all PCR values to arrive at the correct time at the decoder, the transport bit rate must be modulated in accordance with the new RT values.

If CBR is a requirement, or if maintaining all original RT values is a requirement, then PCR restamping must be performed. This is the second method of timing adjustment and is shown in FIG. 9(c)(906). In the figure, the middle PCR value must be adjusted to produce a new value, called PCR'. PCR' can be calculated as follows:

1. In the original, unmodified TS, calculate the original transport bit rate (RT_ORIG) by dividing the original bit difference (DBPCR_ORIG) by the original time difference (DTPCR_ORIG).

2. After PCR packet displacement, the bit difference will be different. Call this new bit difference DBPCR_NEW. The new time difference (DTPCR_NEW) is calculated by dividing RT_ORIG by DBPCR_NEW.

3. PCR' is calculated by adding DTPCR_NEW to the previous PCR value.

Receiver Processing

To avoid buffer underflows due to dented (missing) video frames, the video decoder should detect the presence of a missing frames using techniques such as detecting a continuity_count jump (MPEG-2 TS layer), temporal reference jump (MPEG-2 Video), picture order count jump (H.264 video). The decoder should issue some sort of frame concealment, such as frame repeat or motion flow-based frame synthesis to keep the decoder output running at the correct frame rate. This will avoid decoder buffer underflow.

The methods described herein can be performed by various devices, as are known to those of skill in the art, wherein a processor is coupled to a memory. The memory can contain instruction codes that cause the processor (or processors) to perform the steps and methods described herein It is to be understood that the exemplary embodiments are merely illustrative of the invention and that many variations of the above-described embodiments can be devised by one skilled in the art without departing from the scope of the invention. It is therefore intended that all such variations be included within the scope of the following claims and their equivalents.

What is claimed is:

1. A method of forming an Internet Protocol packet stream, the method comprising the steps of:
receiving a plurality of transport packets each having a transport packet header;
determining whether the transport packet header includes a start of a coded video frame;
if the transport packet header includes the start of the coded video frame, determining if an audio packet lies within a boundary of the coded video frame;
if the audio packet lies within a boundary of a video frame, delaying sending the audio packet until the coded video frame has been sent; and if the transport packet header includes the start of the coded video frame, inserting an Internet Protocol/User Datagram Protocol (IP/UDP) header immediately before the transport packet header to form the Internet Protocol packet stream.

2. The method of claim 1, wherein the received plurality of transport packets are MPEG-2 packets.

3. A method of forming an Internet Protocol packet stream, the method comprising the steps of:
   receiving a plurality of transport packets each having a transport packet header;
   determining whether the transport packet header includes a start of a coded video frame;
   if the transport packet header includes the start of the coded video frame, determining if a one or more audio packets lie within a boundary of the coded video frame;
   removing the one or more audio packets from within the boundary of the coded video frame;
   clustering the one or more audio packets at the boundary of a video frame; and
   if the transport packet header includes the start of the coded video frame, inserting an Internet Protocol/User Datagram Protocol (IP/UDP) header immediately before the transport packet header to form the Internet Protocol packet stream.

4. The method of claim 3, wherein the received plurality of transport packets are MPEG-2 packets.

5. A system for forming an Internet Protocol packet stream comprising:
   one or more processors; and
   a memory coupled to the processors, the memory containing code that causes the processors to perform the steps of:
      receiving a plurality of transport packets each having a transport packet header;
      determining whether the transport packet header includes a start of a coded video frame;
      if the transport packet header includes the start of the coded video frame, determining if an audio packet lies within a boundary of the coded video frame;
      if the audio packet lies within a boundary of a video frame, delaying sending the audio packet until the coded video frame has been sent; and
      if the transport packet header includes the start of the coded video frame, inserting an Internet Protocol/User Datagram Protocol (IP/UDP) header immediately before the transport packet header to form the Internet Protocol packet stream.

6. The system of claim 5, wherein the received plurality of transport packets are MPEG-2 packets.

7. A system for forming an Internet Protocol packet stream comprising:
   one or more processors; and
   a memory coupled to the processors, the memory containing code that causes the processors to perform the steps of:
      receiving a plurality of transport packets each having a transport packet header;
      determining whether the transport packet header includes a start of a coded video frame;
      if the transport packet header includes the start of the coded video frame, determining if a one or more audio packets lie within a boundary of the coded video frame;
      removing the one or more audio packets from within the boundary of the coded video frame; and
      clustering the one or more audio packets at the boundary of the video frame;
      if the transport packet header includes the start of the coded video frame, inserting an Internet Protocol/User Datagram Protocol (IP/UDP) header immediately before the transport packet header to form the Internet Protocol packet stream.

8. The system of claim 7, wherein the received plurality of transport packets are MPEG-2 packets.

\* \* \* \* \*